United States Patent Office 3,191,921
Patented June 29, 1965

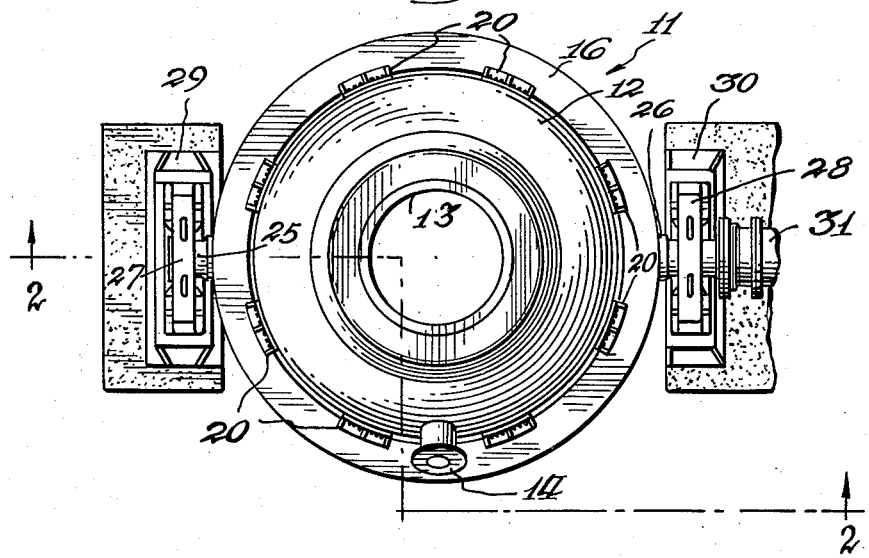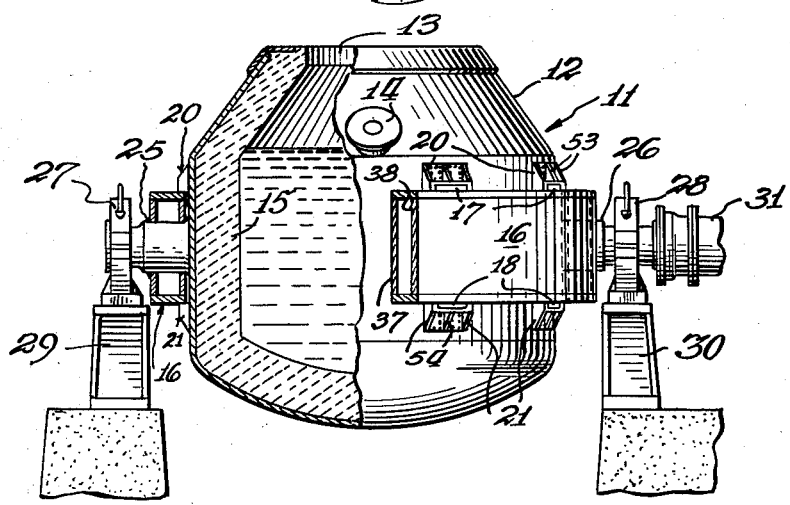

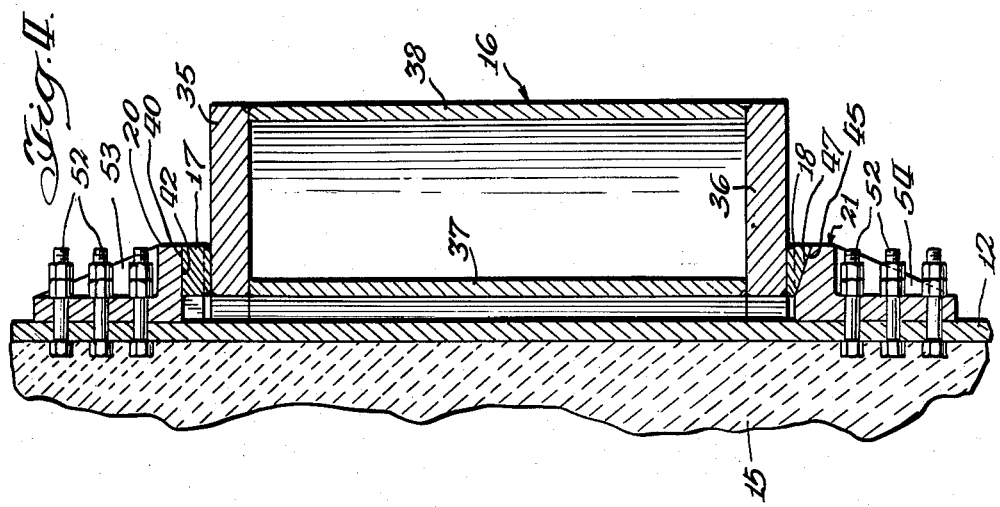
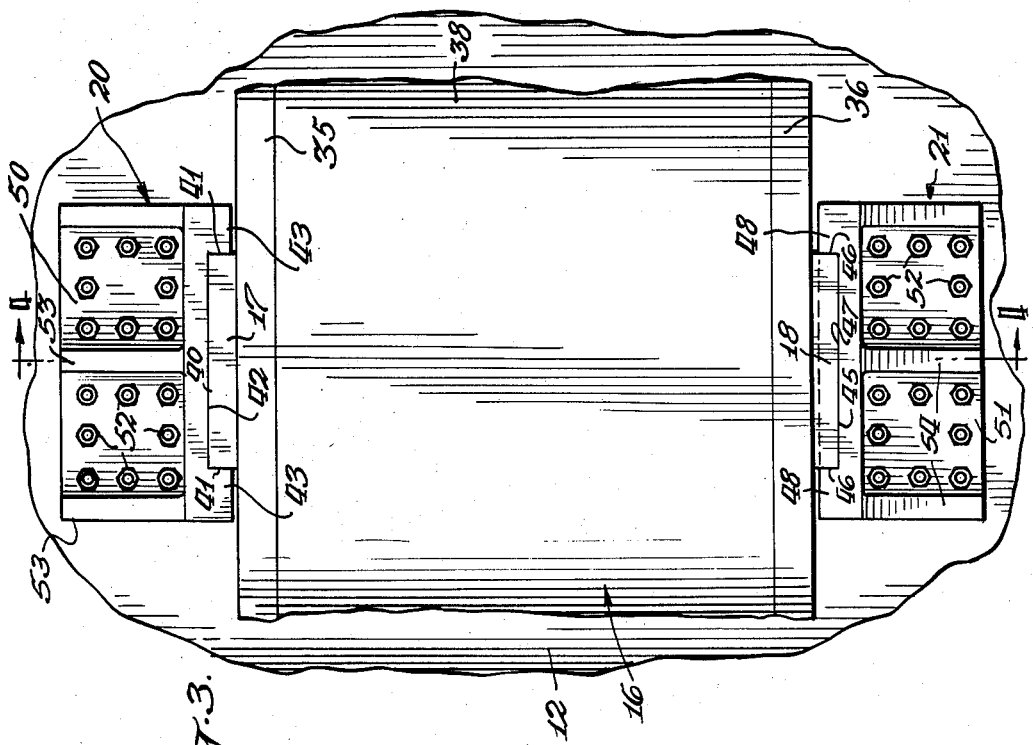

3,191,921
STEEL-MAKING CONVERTER WITH EXPANSION-ACCOMMODATING VESSEL MOUNTING
Paul R. Johnson, Oak Lawn, Ill., assignor to Chicago Bridge & Iron Company, Chicago, Ill., a corporation of Illinois
Filed Jan. 25, 1962, Ser. No. 168,762
7 Claims. (Cl. 266—36)

The present invention relates generally to steel-making converters, and more particularly to converters of this type having mountings for accommodating the radial and vertical expansion which the converter vessel undergoes as a result of the heat generated by the steelmaking operation.

Basically, the invention relates to a converter including a vessel, an annular ring spaced radially from the vessel, means mounting the vessel to the annular ring, a pair of trunnions extending in opposite directions from the ring, stanchions upon which the trunnions are rotatably mounted, and means for rotating the trunnions together with the annular ring and vessel about the axis of the trunnions.

The mounting means for the converter vessel include upper and lower wear elements on the annular ring, and upper and lower lugs on the converter vessel, each lug for bearing against a corresponding wear member on the annular ring. More specifically, when the converter is in an upright position, each upper lug on the converter vessel rests upon an upper wear member on the annular ring to provide a support for the converter vessel. When the converter is in an inverted position, each lower lug (now uppermost) bears against a lower wear member (now also upper) to provide support for the vessel.

During the steel-making operation, the heat generated thereby causes substantial expansion of the converter vessel in both radial and vertical directions; but the expansion undergone by the annular ring is negligible compared to that undergone by the vessel. Accordingly, the distance between the upper and lower lugs on the vessel increases relatively substantially during the steel-making operation, whereas the increase in distance between the upper and lower wear elements on the annular ring is relatively insubstantial. Therefore, in ordinary converters, not constructed in accordance with the present invention, during said expansion the upper lug on the vessel continues to rest upon the upper wear element on the annular ring; but the lower lug on the vessel becomes vertically separated from the lower wear element on the annular ring by a substantial gap.

In ordinary converters, this gap between the lowermost lug and the lowermost wear element would result in a drop by the vessel onto the annular ring when the converter is inverted. The present invention provides means for preventing this gap and the resulting drop by the vessel when the converter is inverted, said drop being undesirable because it may damage the converter. In the converter of the present invention, the lower wear element on the annular ring and the lower lug of the converter vessel are provided with downwardly and outwardly sloping mutually engaging surfaces each extending at an angle having a tangent substantially equal to the distance between the upper and lower lugs at normal room temperatures divided by the outer radius of the converter vessel, said sloping surfaces maintaining the lower lug and lower wear element substantially in engagement during expansion, as will be described in more detail subsequently.

Each of the wear elements on the annular ring also includes means for maintaining the converter vessel in a centered position relative to the annular ring as it undergoes radial expansion, as well as for providing a support for the converter vessel when it is in a tilted position intermediate its upright and inverted positions.

Other features and advantages are inherent in the structure claimed and disclosed, or will become apparent to those skilled in the art from the following detailed description in conjunction with the accompanying diagrammatic drawings, wherein:

FIGURE 1 is a plan view of an embodiment of a steel-making converter, with expansion-accommodating mounting means for the converter vessel, and constructed in accordance with the present invention;

FIGURE 2 is a side elevational view, partially in section, of the converter of FIGURE 1;

FIGURE 3 is an enlarged fragmentary view illustrating an embodiment of expansion-accommodating mounting means for a converter constructed in accordance with the present invention; and FIGURE 4 is a sectional view taken along line 4—4 in FIGURE 3.

Referring initially to FIGURES 1 and 2, there is shown an embodiment of a converter 11 constructed in accordance with the present invention and comprising a vessel 12 having a substantially circular cross-section, an upper opening 13, a tap hole 14, and an interior lined with conventional refractory material 15. Converter 11 also includes a peripheral hollow annular ring 16 spaced radially from converter vessel 12.

As shown in FIGURE 4, the illustrated embodiment of hollow ring 16 is rectangular in cross-section and includes upper and lower walls 35, 36 respectively, and inner and outer walls 37, 38 respectively. Attached to upper wall 35 are a plurality of peripherally spaced upper wear elements 17, and attached to lower wall 36 are a plurality of peripherally spaced lower wear elements 18.

When the converter is in the steel-making normally upright position shown in FIGURE 2, each of a plurality of peripherally spaced upper lugs 20 on converter vessel 12 normally rests atop a respective one of upper wear elements 17. Engagement of upper lugs 20 on upper wear elements 17 mounts converter vessel 12 on annular ring 16 when the converter is in its upright position.

Also connected to converter vessel 12 are a plurality of peripherally spaced lower lugs 21, each of which engages a respective one of lower wear elements 18 mounted on lower wall 36 of annular ring 16 against vertical movement relative to lower wall 36. When the converter is in an inverted pouring position, lugs 21 rest on wear elements 18 to mount converter vessel 12 on annular ring 16 and provide support for the vessel.

As shown in FIGURES 3 and 4, each upper lug 20 also includes a pair of peripherally spaced downwardly depending portions 43 embracing a respective upper wear element 17; and each lower lug 21 includes a pair of peripherally spaced upwardly extending portions 48 embracing a respective lower wear element 18. When converter 11 is in a tilted position, intermediate its upright and inverted positions, one of the depending portions 43 on each upper lug 20 rests on one of the side surfaces 41 of a respective upper wear element 17, and one of the upwardly extending portions 48 on each lower lug 21 rests on one of the side surfaces 46 of a respective lower wear element 18 to support vessel 12 on annular ring 16. Each lug 20, 21 includes a flange portion 50, 51, respectively, attached to vessel 12 by bolts 52, and provided with rigidifying ribs 53, 54 respectively.

Referring again to FIGURES 1 and 2, extending in diametrically opposite directions from annular ring 16 are a pair of trunnions 25, 26 each rotatably mounted by a respective bearing 27, 28 on a respective stanchion 29, 30. A coupling 31 connects trunnion 26 to driving means (not shown) for rotating the trunnions, together with annular ring 16 and vessel 12 between upright and inverted converter positions.

During the steel-making operation, the heat generated thereby causes vessel 12 to undergo expansion in both radial and vertical directions. Because annular ring 16 is radially spaced from vessel 12 and relatively removed from the heat source, the temperature of the annular ring does not increase substantially, in comparison to vessel 12, so that the expansion which ring 16 undergoes is insubstantial compared to the expansion undergone by vessel 12.

The steel-making operation is carried on with the converter in the upright position illustrated in FIGURE 2. In this position each upper lug 20 bears against an upper wear element 17 on the annular ring so that during expansion the vertical positions of upper lugs 20 relative to ring 16 do not change. The vertical expansion of the vessel is manifest in a downward movement of lower lugs 21 relative to annular ring 16. This downward movement of lower lug 21 would normally cause a vertical gap between lug 21 and annular ring 16 equal to the difference between the substantial vertical movement of lug 21 and the insubstantial vertical movement of ring 16 resulting from expansion.

In ordinary converters, not constructed in accordance with the present invention, at the conclusion of the steel-making operation, when converter 11 is inverted to pour the molten steel therefrom, this gap would cause a vertical drop by vessel 12 relative to annular ring 16, which drop could damage the converter. This gap and its resulting drop is minimized in the converter of the present invention, which is provided with mounting means, for the vessel, including a lower outwardly and downwardly sloping wearing or engaging surface 45 on lower wear element 18, and an upper downwardly and outwardly sloping engaging surface 47 on lower lug 21, said surfaces 45, 47 extending at an angle having a tangent substantially equal to approximately the distance between upper and lower lugs 20, 21 at normal room temperatures divided by the outer radius of vessel 12. This is the angle of the path which lower lug 21 and surface 47 follow as vessel 12 expands in both radial and vertical directions as a result of the heat generated by the steel-making operation.

Thus, as vessel 12 undergoes radial and vertical expansion, upper engaging surface 47 of lower lug 21 will remain substantially in engagement with lower wearing surface 45 of lower wear element 18, thereby preventing the formation of a gap between wear element 18 on annular ring 16 and lower lug 21 on vessel 12; thus avoiding the undesirable drop which would otherwise occur when converter 11 is rotated to its inverted position.

As the converter vessel 12 undergoes expansion, depending portions 43 on upper lug 20, cooperating with side surfaces 41 of upper wear element 17, and upwardly extending portions 48 on lower lug 21, cooperating with side surfaces 46 of lower wear element 18, act as guides to maintain vessel 12 centered within annular ring 16 under all conditions of expansion, and in all positions of rotation.

The foregoing detailed description has been given for clearness of understanding only, and no unnecessary limitations should be understood therefrom, as modifications will be obvious to those skilled in the art.

What is claimed is:

1. In a steel-making converter rotatable between upright and inverted positions:
   a vessel, substantially circular in cross-section;
   a peripheral annular ring having upper and lower walls spaced radially from said vessel;
   a plurality of upper lugs on said vessel;
   a plurality of upper wear elements on said annular ring;
   each of said upper wear elements including means for supporting a respective one of said upper lugs when the converter is in an upright position;
   a plurality of lower lugs fixed on said vessel;
   and a plurality of lower wear elements mounted on said lower wall of the annular ring against vertical movement relative to said lower wall, each of said elements including means for supporting a respective one of said lower lugs when the converter is in an inverted position;
   each of said lower lugs having an upper engaging surface extending downwardly and outwardly when the converter is in the upright position;
   each of said lower wear elements having a lower engaging surface, extending downwardly and outwardly when the converter is in the upright position, and for engaging said upper surface on the lower lug;
   both of said engaging surfaces extending at an angle having a tangent substantially equal to the distance separating the upper and lower lugs at room temperature divided by the outer radius of the vessel.

2. In a steel-making converter as recited in claim 1 wherein:
   each of said lugs includes a pair of peripherally spaced portions, extending vertically when the converter is upright, and embracing a respective one of said wear elements.

3. In a steel-making converter as recited in claim 2 wherein:
   each of said wear elements includes means for supporting one of said peripherally spaced lug portions when the converter is in a tilted position intermediate said upright and inverted positions.

4. In a steel-making converter as recited in claim 1 wherein:
   said annular ring has a substantially rectangular cross-section defined by upper and lower walls and inner and outer walls;
   said upper wear elements being on said upper wall;
   and said lower wear elements being on said lower wall.

5. In a steel-making converter as recited in claim 1 and comprising:
   a pair of trunnions extending in diametrically opposite directions from said annular ring;
   means mounting said trunnions for rotation;
   and coupling means for connecting one of said trunnions to rotating means.

6. In a steel-making converter rotatable between upright and inverted positions:
   a vessel;
   upper lugs on said vessel;
   an annular ring having upper and lower walls spaced radially from said vessel;
   means on said annular ring for supporting said upper lugs when the converter is in said upright position;
   a plurality of lower lugs fixed on said vessel;
   and a plurality of elements mounted on said lower wall of the annular ring against vertical movement relative to said lower wall, each of said elements including means for engaging a respective one of said lower lugs;
   each of said elements and each of said lower lugs having respective downwardly and outwardly extending mutually engaging surfaces, when the vessel is upright, extending at an angle having a tangent substantially equal to the distance between the upper and lower lugs at room temperature divided by the outer radius of the vessel.

7. In a steel-making converter rotatable between upright and inverted positions;
   a vessel;
   upper lugs on said vessel;
   an annular ring having upper and lower walls spaced radially from said vessel;
   means on said annular ring for supporting said upper lugs when the converter is in said upright position;
   a plurality of lower lugs fixed on said vessel;

and a plurality of elements mounted on said lower wall of the annular ring against vertical movement relative to said lower wall, each of said elements including means for engaging a respective one of said lower lugs;

each of said elements and each of said lower lugs having respective downwardly and outwardly extending mutually engaging surfaces, when the vessel is upright, extending at substantially the angle of the path followed by said lower lugs as the vessel expands in both vertical and radial directions during the steelmaking operation.

References Cited by the Examiner
UNITED STATES PATENTS

| | | | |
|---|---|---|---|
| 997,639 | 7/11 | Sherman | 266—39 |
| 3,000,621 | 9/61 | Puxkandl | 266—36 X |

MORRIS O. WOLK, *Primary Examiner.*

JAMES H. TAYMAN, Jr., *Examiner.*